(12) United States Patent
Lord et al.

(10) Patent No.: US 11,298,635 B2
(45) Date of Patent: Apr. 12, 2022

(54) STORM WATER PRETREATMENT CHAMBER

(71) Applicants: Christopher Allen Lord, Elk River, MN (US); Mitchell Donald Haustein, Champlin, MN (US)

(72) Inventors: Christopher Allen Lord, Elk River, MN (US); Mitchell Donald Haustein, Champlin, MN (US)

(73) Assignee: Annoka Conservation District, Ham Lake, MN (US)

( * ) Notice: Subject to any disclaimer, the term of this patent is extended or adjusted under 35 U.S.C. 154(b) by 280 days.

(21) Appl. No.: 16/738,666

(22) Filed: Jan. 9, 2020

(65) Prior Publication Data
US 2021/0213376 A1    Jul. 15, 2021

(51) Int. Cl.
| | | |
|---|---|---|
| *B01D 35/00* | (2006.01) | |
| *C02F 1/00* | (2006.01) | |
| *B01D 21/00* | (2006.01) | |
| *B01D 39/08* | (2006.01) | |
| *C02F 103/00* | (2006.01) | |

(52) U.S. Cl.
CPC ..... *B01D 21/0006* (2013.01); *B01D 21/0012* (2013.01); *B01D 39/083* (2013.01); *B01D 39/086* (2013.01); *C02F 1/001* (2013.01); *B01D 2239/0478* (2013.01);
(Continued)

(58) Field of Classification Search
CPC ................ B01D 21/00; B01D 21/0003; B01D 21/0006; B01D 21/0012; B01D 21/0024; B01D 21/0039; B01D 21/0087; B01D 21/02; B01D 21/10; B01D 21/30; B01D 29/00; B01D 29/0002; B01D 29/03; B01D 29/11; B01D 29/50; B01D 29/56; B01D 35/00; B01D 35/02; B01D 35/147; B01D 35/30; B01D 35/301; B01D 35/306; B01D 36/02; B01D 36/04; B01D 2201/30; B01D 2201/31; B01D 2201/313; B01D 2201/32; B01D 2201/301; B01D 2201/302; B01D 2201/305; B01D 2201/306; B01D 2201/307; E03F 5/12; E03F 5/125; E03F 5/14; E03F 5/04; E03F 5/16; E03F 2201/00; E03F 2201/10; E03F 2201/40; E03F 1/00; E03F 1/001; E03F 1/003; E03F 1/005; E03F 1/006; E03F 1/007; E03F 5/00; E03F 5/0403; E03F 5/0404; E03F 5/042; C02F 1/00; C02F 1/001; C02F 9/00; C02F 2103/00; C02F 2103/001; C02F 2103/002; C02F 2103/003; C02F 2103/005; C02F 2103/10; C02F 2103/20; C02F 2201/00;
(Continued)

(56) References Cited

U.S. PATENT DOCUMENTS

| | | |
|---|---|---|
| 4,781,796 A | 11/1988 | Bridle et al. |
| 5,322,629 A | 6/1994 | Stewart |

(Continued)

*Primary Examiner* — Allison G Fitzsimmons
(74) *Attorney, Agent, or Firm* — Mitchell A. Rossman; Terra Nova Patent Law, PLLC

(57) ABSTRACT

The present invention provides a storm water pretreatment chamber. The storm water pretreatment chamber includes: a base, an inlet sidewall, a first sidewall, a second sidewall, a filter sidewall, a handle, a first locking mechanism, a second locking mechanism, a first lifting cable, and a second lifting cable. Methods of treating storm water are also provided.

20 Claims, 5 Drawing Sheets

(52) U.S. Cl.
CPC ............... *B01D 2239/0613* (2013.01); *C02F 2001/007* (2013.01); *C02F 2103/001* (2013.01)

(58) Field of Classification Search
CPC .......... C02F 2201/002; C02F 2201/007; C02F 2307/00; C02F 2307/08
USPC ....... 210/170, 767, 776, 800, 224, 153, 163, 210/164, 167.1, 167.12, 167.13, 167.14, 210/167.15, 167.16, 167.17, 167.19, 210/167.3, 348, 473, 474, 477, 475, 479, 210/481

See application file for complete search history.

(56) References Cited

U.S. PATENT DOCUMENTS

| | | |
|---|---|---|
| 5,533,303 A | 7/1996 | Harvey |
| 6,277,274 B1 | 8/2001 | Coffman |
| 6,569,321 B2 | 5/2003 | Coffman |
| 7,025,879 B1 | 4/2006 | Ticknor |
| 7,041,213 B1 | 5/2006 | McClanahan |
| 7,056,058 B2 | 6/2006 | Urriola et al. |
| 7,105,086 B2 | 9/2006 | Saliba |
| 7,452,165 B2 | 11/2008 | Tyler |
| 7,645,390 B1 | 1/2010 | McClanahan |
| 7,699,557 B2 | 4/2010 | Shaw et al. |
| 7,776,217 B2 | 8/2010 | Lucas |
| 7,799,235 B2 | 9/2010 | Olson et al. |
| 8,501,016 B2 | 8/2013 | Lord et al. |
| 8,858,804 B2 | 10/2014 | Lord et al. |
| 2006/0016767 A1 | 1/2006 | Olson et al. |
| 2009/0101555 A1 | 4/2009 | Scarpine et al. |
| 2009/0261026 A1 | 10/2009 | Grewal et al. |
| 2009/0290936 A1 | 11/2009 | Underwood |
| 2010/0212755 A1 | 8/2010 | Gear |
| 2017/0284077 A1* | 10/2017 | Deurloo ................ B01D 29/96 |

* cited by examiner

STORM WATER PRETREATMENT CHAMBER

BACKGROUND OF THE INVENTION

When it rains on unimproved natural land, the rain and storm water runoff is either absorbed into the soil or moves along the surface of the land, moving downward towards creeks and rivers. However, as areas become more densely populated, this natural dispersion of rain and storm water is altered by the man-made improvements, for example, parking lots, roads, and buildings. This leaves less open ground surface to absorb the rain and adds to the storm water runoff.

In many cities, storm water sewers are constructed to handle the large amount of storm water runoff that comes off of the buildings, parking lots, and roads. The storm water sewers route the water to creeks and drainage ditches, which form the tributaries to larger rivers.

Common ways of treating storm water involve installing a curb-cut on a side of a street and allowing the storm water to flow out into a rain garden. However, debris can build up and cause the storm water to by-pass the curb cut before the rain garden is full of storm water. In addition, accumulated sediment in the rain garden can smother the existing plants, reduce infiltration and/or filtration capacity, and is unsightly.

Inlet materials and structures at the curb-cut inlets are variable. For example, turf strips and rock inlets are commonly used. Turf strips are often ineffective and require exhaustive raking and annual replacement. Rock inlets also lose their effectiveness rapidly without frequent labor intensive cleaning. Alternative structures, for example, chambers filled with porous media and underdrains, can be cost prohibitive and may fail resulting in flooding the rain garden with debris, which requires extensive clean-up.

What is desired is an easily maintained device that can remove debris and sediment from storm water and allow the treated storm water to enter a storm water receiving feature, for example, a rain garden.

SUMMARY OF THE INVENTION

The present invention provides a storm water pretreatment chamber. The storm water pretreatment chamber includes: a base, an inlet sidewall, a first sidewall, a second sidewall, and a filter sidewall. Methods of treating storm water are also provided.

The present invention provides a storm water pretreatment chamber for storm water receiving features such as rain gardens. The storm water pretreatment chamber installs easily, simplifies routine maintenance, maximizes functional capacity, and extends the life of the storm water receiving features. The storm water pretreatment chamber is easy to install and functional. The storm water pretreatment chamber prevents premature rain garden bypass of the untreated storm water due to sediment and debris accumulation. The storm water pretreatment chamber captures both large debris and fine particles. Additionally, the storm water pretreatment chamber contains an overflow feature that ensures storm water can enter the storm water receiving feature in spite of neglected maintenance. The storm water pretreatment chamber includes a filter that can be easily removed and swept or rinsed clean with a garden hose. Further, sediment, leaves, and grass clippings, which are trapped inside the storm water pretreatment chamber, are easily removed with, for example, a shovel. The storm water pretreatment chamber is also easily and quickly installed into new or existing storm water receiving features. Unlike existing devices, the storm water pretreatment chamber allows the water to exit it thus preventing stagnant water inside the storm water pretreatment chamber.

The present invention provides a storm water pretreatment chamber. The storm water pretreatment chamber includes: a base having a first surface, a second surface, a proximal end, a distal end, and including: an inlet sidewall having a first surface, a second surface, a proximal end, a distal end, a first edge, a second edge, a third edge, and a fourth edge, wherein the first edge of the inlet sidewall is in contact with the second surface of the base, wherein the first surface of the inlet sidewall is in communication with an atmosphere and in position to receive untreated storm water; a first sidewall having a first surface, a second surface, a proximal end, a distal end, a first edge, a second edge, a third edge, a fourth edge, wherein the proximal end of the first sidewall is in contact with the proximal end of the inlet sidewall, wherein the first edge of the first sidewall is in contact with the second surface of the base; a second sidewall having a first surface, a second surface, a proximal end, a distal end, a first edge, a second edge, a third edge, a fourth edge, wherein the proximal end of the second sidewall is in contact with the distal end of the inlet sidewall, wherein the first edge of the second sidewall is in contact with the second surface of the base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first sidewall, wherein the distal end of the filter sidewall is in contact with the distal end of the second sidewall, wherein the first edge of the filter is in contact with the second surface of the base, wherein the first edge of the outlet grate is in contact with the third edge of the filter, the distal end of the first sidewall, and the distal end of the second sidewall, wherein the inlet sidewall, the first sidewall, the second sidewall, and the filter sidewall form a debris and sediment trap, wherein the second surface of the filter sidewall is in communication with the atmosphere and in position to release treated storm water from the debris and sediment trap into a storm water receiving feature, and wherein the outlet grate enables storm water to flow out of the debris and sediment trap and into the storm water receiving feature when the filter is clogged.

In one embodiment, the storm water pretreatment chamber further includes a cover having a first surface, a second surface, a proximal end, and a distal end, and wherein the second surface of the cover is in contact the third edge of the first sidewall and the third edge of the second sidewall.

In one embodiment, the cover includes a handle connected to the first surface of the cover. In one embodiment, the cover includes a first locking mechanism at the proximal end that operatively connects to the first sidewall and a second locking mechanism at the distal end that operatively connects to the second sidewall. In one embodiment, the cover includes a third grate. In one embodiment, the cover is a vented cover. In one embodiment, the cover includes a slotted grate.

In one embodiment, the storm water pretreatment chamber further includes a first lifting cable connected to the first surface of the first sidewall. In one embodiment, the storm water pretreatment chamber further includes a second lifting cable connected to the second surface of the second sidewall.

In one embodiment, the inlet sidewall further includes an inlet grate. In one embodiment, the outlet grate includes two or more outlet openings that are smaller than two or more inlet openings in the inlet grate.

The present invention provides a storm water pretreatment chamber. The storm water pretreatment chamber includes: a base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the base, wherein the first surface of the inlet sidewall is in communication with an atmosphere and in position to receive untreated storm water and to collect one or more floating debris that does not pass through the inlet grate; a first sidewall having a first surface, a second surface, a proximal end, a distal end, a first edge, a second edge, a third edge, a fourth edge, wherein the proximal end of the first sidewall is in contact with the proximal end of the inlet sidewall, wherein the first edge of the first sidewall is in contact with the second surface of the base; a second sidewall having a first surface, a second surface, a proximal end, a distal end, a first edge, a second edge, a third edge, a fourth edge, wherein the proximal end of the second sidewall is in contact with the distal end of the inlet sidewall, wherein the first edge of the second sidewall is in contact with the second surface of the base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first sidewall, wherein the distal end of the filter sidewall is in contact with the distal end of the second sidewall, wherein the first edge of the filter is in contact with the second surface of the base, wherein the first edge of the outlet grate is in contact with the third edge of the filter, the distal end of the first sidewall, and the distal end of the second sidewall, wherein the inlet sidewall, the first sidewall, the second sidewall, and the filter sidewall form a debris and sediment trap, wherein the second surface of the filter sidewall is in communication with the atmosphere and in position to release treated storm water from the debris and sediment trap into a storm water receiving feature, and wherein the outlet grate enables storm water to flow out of the debris and sediment trap and into the storm water receiving feature when the filter is clogged.

In one embodiment, the storm water pretreatment chamber further includes a cover having a first surface, a second surface, a proximal end, and a distal end, and wherein the second surface of the cover is in contact the third edge of the first sidewall and the third edge of the second sidewall.

In one embodiment, the cover includes a handle connected to the first surface of the cover. In one embodiment, the cover includes a first locking mechanism at the proximal end that operatively connects to the first sidewall. In one embodiment, the first locking mechanism is a first roto-lock mechanism. In one embodiment, the cover includes a second locking mechanism at the distal end that operatively connects to the second sidewall. In one embodiment, the second locking mechanism is a second row-lock mechanism. In one embodiment, the cover includes a first locking mechanism at the proximal end that operatively connects to the first sidewall and a second locking mechanism at the distal end that operatively connects to the second sidewall.

In one embodiment, the base includes a water impermeable base. In one embodiment, the water impermeable base includes a concrete. In one embodiment, the water impermeable base includes a steel-reinforced concrete. In one embodiment, the cover is a composite material. In one embodiment, the composite material is a fiberglass reinforced plastic composite material. In one embodiment, the composite material is a Fiberlite glass reinforced plastic composite material made by Fiberlite (Smithfield, N.C., USA).

In one embodiment, the inlet sidewall includes a concrete. In one embodiment, the inlet sidewall includes a steel-reinforced concrete. In one embodiment, the first sidewall includes a concrete. In one embodiment, the first sidewall includes a steel-reinforced concrete. In one embodiment, the second sidewall includes a concrete. In one embodiment, the second sidewall includes a steel-reinforced concrete.

In one embodiment, the storm water pretreatment chamber further includes a first lifting cable connected to the first surface of the first sidewall. In one embodiment, the first lifting cable is a first embedded two-point lifting cable. In one embodiment, the storm water pretreatment chamber further includes a second lifting cable connected to the second surface of the second sidewall. In one embodiment, the second lifting cable is a second embedded two-point lifting cable. In one embodiment, the filter includes a plastic-coated woven fiberglass screen, a rubber coated woven fiberglass screen, or a plastic and rubber coated woven fiberglass screen.

In one embodiment, the filter includes a fiberglass grate with a plastic-coated woven screen in an anodized aluminum frame, a fiberglass grate with a rubber-coated woven screen in an anodized aluminum frame, or a fiberglass grate with a plastic and rubber-coated woven screen in an anodized aluminum frame. In one embodiment, the inlet grate includes a fiberglass. In one embodiment, the outlet grate includes two or more outlet openings that are smaller than two or more inlet openings in the inlet grate. In one embodiment, the outlet grate includes a fiberglass. In one embodiment, the debris and sediment trap collects materials that are smaller than the two or more inlet openings in the inlet grate and larger than the two or more openings in the filter sidewall.

The present invention provides a storm water pretreatment chamber. The storm water pretreatment chamber includes: a base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the base, wherein the first surface of the inlet sidewall is in communication with an atmosphere and in position to receive untreated storm water and to collect one or more floating debris that does not pass through the inlet grate; a first sidewall having a first surface, a second surface, a proximal end, a distal end, a first edge, a second edge, a third edge, a fourth edge, wherein the proximal end of the first sidewall is in contact with the proximal end of the inlet sidewall, wherein the first edge of the first sidewall is in contact with the second surface of the base; a second sidewall having a first surface, a second surface, a proximal end, a distal end, a first edge, a second edge, a third edge, a fourth edge, wherein the proximal end of the second sidewall is in contact with the distal end of the inlet sidewall, wherein the first edge of the second sidewall is in contact with the second surface of the base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first sidewall, wherein the distal end of the filter sidewall is in contact with the distal end of the second sidewall, wherein the first edge of the filter is in contact with the second surface of the base, wherein the first edge of the outlet grate is in contact with the third edge of the filter, the distal end of the first sidewall, and the distal end of the second sidewall, wherein the inlet sidewall, the first sidewall, the second sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged; a cover having a first surface, a second surface, a proximal end, a distal end, and a handle on the first surface, wherein the second surface of the cover is in contact the third edge of the first sidewall and the third edge of the second sidewall, wherein the cover includes a first locking mechanism at the proximal end that operatively connects to the first sidewall and a second locking mechanism at the distal end that operatively connects to the second sidewall, a first lifting cable connected to the first surface of the first sidewall, and a second lifting cable connected to the second surface of the second sidewall.

The present invention provides a storm water pretreatment chamber. The storm water pretreatment chamber includes: a water impermeable base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the water impermeable base, wherein the first surface of the inlet sidewall is in communication with an atmosphere and in position to receive untreated storm water and to collect one or more floating debris that does not pass through the inlet grate; a first water impermeable sidewall having a first surface, a second surface, a proximal end, a distal end, a first edge, a second edge, a third edge, a fourth edge, wherein the proximal end of the first water impermeable sidewall is in contact with the proximal end of the inlet sidewall, wherein the first edge of the first water impermeable sidewall is in contact with the second surface of the water impermeable base; a second water impermeable sidewall having a first surface, a second surface, a proximal end, a distal end, a first edge, a second edge, a third edge, a fourth edge, wherein the proximal end of the second water impermeable sidewall is in contact with the distal end of the inlet sidewall, wherein the first edge of the second water impermeable sidewall is in contact with the second surface of the water impermeable base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water impermeable sidewall, wherein the distal end of the filter sidewall is in contact with the distal end of the second water impermeable sidewall, wherein the first edge of the filter is in contact with the second surface of the water impermeable base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged, wherein the outlet grate includes two or more outlet openings that are smaller than two or more inlet openings in the inlet grate, wherein the debris and sediment trap collects materials that are smaller than the two or more inlet openings in the inlet grate and larger than the two or more openings in the filter sidewall; a cover having a first surface, a second surface, a proximal end, a distal end, and a handle on the first surface, wherein the second surface of the cover is in contact with the third edge of the first water impermeable sidewall and the third edge of the second water impermeable sidewall, wherein the cover includes a first roto-lock mechanism at the proximal end that operatively connects to the first water impermeable sidewall and a second roto-lock mechanism at the distal end that operatively connects to the second water impermeable sidewall, a first embedded two-point lifting cable connected to the first surface of the first water impermeable sidewall, and a second embedded two-point lifting cable connected to the second surface of the second water impermeable sidewall.

The present invention provides a storm water pretreatment chamber. The storm water pretreatment chamber includes: a water impermeable base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the water impermeable base, wherein the first surface of the inlet sidewall is in communication with an atmosphere and in position to receive untreated storm water and to collect one or more floating debris that does not pass through the inlet grate; a first water impermeable sidewall having a first surface, a second surface, a proximal end, a distal end, a first edge, a second edge, a third edge, a fourth edge, wherein the proximal end of the first water impermeable sidewall is in contact with the proximal end of the inlet sidewall, wherein the first edge of the first water impermeable sidewall is in contact with the second surface of the water impermeable base; a second water impermeable sidewall having a first surface, a second surface, a proximal end, a distal end, a first edge, a second edge, a third edge, a fourth edge, wherein the proximal end of the second water impermeable sidewall is in contact with the distal end of the inlet sidewall, wherein the first edge of the second water impermeable sidewall is in contact with the second surface of the water impermeable base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water impermeable sidewall, wherein the distal end of the filter sidewall is in contact with the distal end of the second water impermeable sidewall, wherein the first edge of the filter is in contact with the second surface of the water impermeable base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged; a cover having a first surface, a second surface, a proximal end, a distal end, and a handle on the first surface, wherein the second surface of the cover is in contact with the third edge of the first water impermeable sidewall and the third edge of the second water impermeable sidewall, wherein the cover includes a first locking mechanism at the proximal end that operatively connects to the first water impermeable sidewall and a second locking mechanism at the distal end that operatively connects to the second water impermeable sidewall, a first lifting cable connected to the first surface of the first water impermeable sidewall, and a second lifting cable connected to the second surface of the second water impermeable sidewall.

The present invention provides a storm water pretreatment chamber. The storm water pretreatment chamber includes: a water impermeable base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the water impermeable base, wherein the first surface of the inlet sidewall is in communication with an atmosphere and in position to receive untreated storm water and to collect one or more floating debris that does not pass through the inlet grate; a first water impermeable sidewall having a first surface, a second surface, a proximal end, a distal end, a first edge, a second edge, a third edge, a fourth edge, wherein the proximal end of the first water impermeable sidewall is in contact with the proximal end of the inlet sidewall, wherein the first edge of the first water impermeable sidewall is in contact with the second surface of the water impermeable base; a second water impermeable sidewall having a first surface, a second surface, a proximal end, a distal end, a first edge, a second edge, a third edge, a fourth edge, wherein the proximal end of the second water impermeable sidewall is in contact with the distal end of the inlet sidewall, wherein the first edge of the second water impermeable sidewall is in contact with the second surface of the water impermeable base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water impermeable sidewall, wherein the distal end of the filter sidewall is in contact with the distal end of the second water impermeable sidewall, wherein the first edge of the filter is in contact with the second surface of the water impermeable base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged, wherein the outlet grate includes two or more outlet openings that are smaller than two or more inlet openings in the inlet grate, wherein the debris and sediment trap collects materials that are smaller than the two or more inlet openings in the inlet grate and larger than the two or more openings in the filter sidewall; a cover having a first surface, a second surface, a proximal end, a distal end, and a handle on the first surface, wherein the second surface of the cover is in contact with the third edge of the first water impermeable sidewall and the third edge of the second water impermeable sidewall, wherein the cover includes a first roto-lock mechanism at the proximal end that operatively connects to the first water impermeable sidewall and a second roto-lock mechanism at the distal end that operatively connects to the second water impermeable sidewall, a first embedded two-point lifting cable connected to the first surface of the first water impermeable sidewall, and a second embedded two-point lifting cable connected to the second surface of the second water impermeable sidewall.

The present invention provides a rectangular storm water pretreatment chamber. The rectangular storm water pretreatment chamber includes: a rectangular base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the rectangular base, wherein the first surface of the inlet sidewall is in communication with an atmosphere and in position to receive untreated storm water and to collect one or more floating debris that does not pass through the inlet grate; a first sidewall having a first surface, a second surface, a proximal end, a distal end, a first edge, a second edge, a third edge, a fourth edge, wherein the proximal end of the first sidewall is in contact with the proximal end of the inlet sidewall, wherein the first edge of the first sidewall is in contact with the second surface of the rectangular base; a second sidewall having a first surface, a second surface, a proximal end, a distal end, a first edge, a second edge, a third edge, a fourth edge, wherein the proximal end of the second sidewall is in contact with the distal end of the inlet sidewalk wherein the first edge of the second sidewall is in contact with the second surface of the rectangular base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first sidewall, wherein the distal end of the filter sidewall is in contact with the distal end of the second sidewall, wherein the first edge of the filter is in contact with the second surface of the rectangular base, wherein the first edge of the outlet grate is in contact with the third edge of the filter, the distal end of the first sidewall, and the distal end of the second sidewall, wherein the inlet sidewall, the first sidewall, the second sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged; a rectangular cover having a first surface, a second surface, a proximal end, and a distal end, and wherein the second surface of the rectangular cover is in contact with the third edge of the first sidewall and the third edge of the second sidewall.

The present invention provides a square storm water pretreatment chamber. The square storm water pretreatment chamber includes: a square base having a first surface, a second surface, a proximal end, a distal end, and including: an inlet sidewall having a first surface, a second surface, a proximal end, a distal end, a first edge, a second edge, a third edge, a fourth edge, and an inlet grate, Wherein the first edge of the inlet sidewall is in contact with the second surface of the square base, wherein the first surface of the inlet sidewall is in communication with an atmosphere and in position to receive untreated storm water and to collect one or more floating debris that does not pass through the inlet grate; a first sidewall having a first surface, a second surface, a proximal end, a distal end, a first edge, a second edge, a third edge, a fourth edge, wherein the proximal end of the first sidewall is in contact with the proximal end of the inlet sidewall, wherein the first edge of the first sidewall is in contact with the second surface of the square base; a second sidewall having a first surface, a second surface, a proximal end, a distal end, a first edge, a second edge, a third edge, a fourth edge, wherein the proximal end of the second sidewall is in contact with the distal end of the inlet sidewall, wherein the first edge of the second sidewall is in contact with the second surface of the square base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first sidewall, wherein the distal end of the filter sidewall is in contact with the distal end of the second sidewall, wherein the first edge of the filter is in contact with the second surface of the square base, wherein the first edge of the outlet grate is in contact with the third edge of the filter, the distal end of the first sidewall, and the distal end of the second sidewall, wherein the inlet sidewall, the first sidewall, the second sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged; a square cover having a first surface, a second surface, a proximal end, and a distal end, and wherein the second surface of the square cover is in contact with the third edge of the first sidewall and the third edge of the second sidewall.

The present invention provides a circular storm water pretreatment chamber. The circular storm water pretreatment chamber includes: a circular base having a first surface, a second surface, a proximal end, a distal end, and including: a semi-circular inlet sidewall having a first surface, a second surface, a proximal end, a distal end, a first edge, a second edge, a third edge, a fourth edge, and an semi-circular inlet grate, wherein the first edge of the semi-circular inlet sidewall is in contact with the second surface of the circular base, wherein the first surface of the semi-circular inlet sidewall is in communication with an atmosphere and in position to receive untreated storm water and to collect one or more floating debris that does not pass through the semi-circular inlet grate; a first semi-circular sidewall having a first surface, a second surface, a proximal end, a distal end, a first edge, a second edge, a third edge, a fourth edge, wherein the proximal end of the first semi-circular sidewall is in contact with the proximal end of the semi-circular inlet sidewall, wherein the first edge of the first semi-circular sidewall is in contact with the second surface of the circular base; a second semi-circular sidewall having a first surface, a second surface, a proximal end, a distal end, a first edge, a second edge, a third edge, a fourth edge, wherein the proximal end of the second semi-circular sidewall is in contact with the distal end of the semi-circular inlet sidewall, wherein the first edge of the second semi-circular sidewall is in contact with the second surface of the circular base; a semi-circular filter sidewall having a first surface, a second surface, a proximal end, a distal end, a first edge, a second edge, a third edge, a fourth edge, a semi-circular filter, and an semi-circular outlet grate, wherein the semi-circular filter has a first surface, a second surface, a proximal end, a distal end, a first edge, a second edge, a third edge, and a fourth edge, wherein the semi-circular outlet grate has a first surface, a second surface, a proximal end, a distal end, a first edge, a second edge, a third edge, and a fourth edge, wherein the proximal end of the semi-circular filter sidewall is in contact with the distal end of the first semi-circular sidewall, wherein the distal end of the semi-circular filter sidewall is in contact with the distal end of the second semi-circular sidewall, wherein the first edge of the semi-circular filter is in contact with the second surface of the circular base, wherein the first edge of the semi-circular outlet grate is in contact with the third edge of the semi-circular filter, the distal end of the first semi-circular sidewall, and the distal end of the second semi-circular sidewall, wherein the semi-circular inlet sidewall, the first semi-circular sidewall, the second semi-circular sidewall, and the semi-circular filter sidewall form a debris and sediment trap, wherein the second surface of the semi-circular filter sidewall is in communication with the atmosphere and in position to release treated storm water from the debris and sediment trap into a storm water receiving feature, wherein the semi-circular outlet grate enables storm water to flow out of the debris and sediment trap and into the storm water receiving feature when the semi-circular filter is clogged; a circular cover having a first surface, a second surface, a proximal end, and a distal end, and wherein the second surface of the circular cover is in contact with the third edge of the first semi-circular sidewall and the third edge of the second semi-circular sidewall.

The present invention provides an oval storm water pretreatment chamber. The oval storm water pretreatment chamber includes: an oval base having a first surface, a second surface, a proximal end, a distal end, and including: a semi-oval inlet sidewall having a first surface, a second surface, a proximal end, a distal end, a first edge, a second edge, a third edge, a fourth edge, and an semi-oval inlet grate, wherein the first edge of the semi-oval inlet sidewall is in contact with the second surface of the oval base, wherein the first surface of the semi-oval inlet sidewall is in communication with an atmosphere and in position to receive untreated storm water and to collect one or more floating debris that does not pass through the semi-oval inlet grate; a first semi-oval sidewall having a first surface, a second surface, a proximal end, a distal end, a first edge, a second edge, a third edge, a fourth edge, wherein the proximal end of the first semi-oval sidewall is in contact with the proximal end of the semi-oval inlet sidewall, wherein the first edge of the first semi-oval sidewall is in contact with the second surface of the oval base; a second semi-oval sidewall having a first surface, a second surface, a proximal end, a distal end, a first edge, a second edge, a third edge, a fourth edge, wherein the proximal end of the second semi-oval sidewall is in contact with the distal end of the semi-oval inlet sidewall, wherein the first edge of the second semi-oval sidewall is in contact with the second surface of the oval base; a semi-oval filter sidewall having a first surface, a second surface, a proximal end, a distal end, a first edge, a second edge, a third edge, a fourth edge, a semi-oval filter, and an semi-oval outlet grate, wherein the semi-oval filter has a first surface, a second surface, a proximal end, a distal end, a first edge, a second edge, a third edge, and a fourth edge, wherein the semi-oval outlet grate has a first surface, a second surface, a proximal end, a distal end, a first edge, a second edge, a third edge, and a fourth edge, wherein the proximal end of the semi-oval filter sidewall is in contact with the distal end of the first semi-oval sidewall, wherein the distal end of the semi-oval filter sidewall is in contact with the distal end of the second semi-oval sidewall, wherein the first edge of the semi-oval filter is in contact with the second surface of the oval base, wherein the first edge of the semi-oval outlet grate is in contact with the third edge of the semi-oval filter, the distal end of the first semi-oval sidewall, and the distal end of the second semi-oval sidewall, wherein the semi-oval inlet sidewall, the first semi-oval sidewall, the second semi-oval sidewall, and the semi-oval filter sidewall form a debris and sediment trap, wherein the second surface of the semi-oval filter sidewall is in communication with the atmosphere and in position to release treated storm water from the debris and sediment trap into a storm water receiving feature, wherein the semi-oval outlet grate enables storm water to flow out of the debris and sediment trap and into the storm water receiving feature when the semi-oval filter is clogged; an oval cover having a first surface, a second surface, a proximal end, and a distal end, and wherein the second surface of the oval cover is in contact with the third edge of the first semi-oval sidewall and the third edge of the second semi-oval sidewall.

The present invention provides a rectangular storm water pretreatment chamber. The rectangular storm water pretreatment chamber includes: a rectangular base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the rectangular base, wherein the first surface of the inlet sidewall is in communication with an atmosphere and in position to receive untreated storm water and to collect one or more floating debris that does not pass through the inlet grate; a first water impermeable sidewall having a first surface, a second surface, a proximal end, a distal end, a first edge, a second edge, a third edge, a fourth edge, wherein the proximal end of the first water impermeable sidewall is in contact with the proximal end of the inlet sidewall, wherein the first edge of the first water impermeable sidewall is in contact with the second surface of the rectangular base; a second water impermeable sidewall having a first surface, a second surface, a proximal end, a distal end, a first edge, a second edge, a third edge, a fourth edge, wherein the proximal end of the second water impermeable sidewall is in contact with the distal end of the inlet sidewall, wherein the first edge of the second water impermeable sidewall is in contact with the second surface of the rectangular base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water impermeable sidewall, wherein the distal end of the filter sidewall is in contact with the distal end of the second water impermeable sidewall, wherein the first edge of the filter is in contact with the second surface of the rectangular base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged; a rectangular cover having a first surface, a second surface, a proximal end, and a distal end, and wherein the second surface of the rectangular cover is in contact with the third edge of the first water impermeable sidewall and the third edge of the second water impermeable sidewall.

The present invention provides a square storm water pretreatment chamber. The square storm water pretreatment chamber includes: a square base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the square base, wherein the first surface of the inlet sidewall is in communication with an atmosphere and in position to receive untreated storm water and to collect one or more floating debris that does not pass through the inlet grate; a first water impermeable sidewall having a first surface, a second surface, a proximal end, a distal end, a first edge, a second edge, a third edge, a fourth edge, wherein the proximal end of the first water impermeable sidewall is in contact with the proximal end of the inlet sidewall, wherein the first edge of the first water impermeable sidewall is in contact with the second surface of the square base; a second water impermeable sidewall having a first surface, a second surface, a proximal end, a distal end, a first edge, a second edge, a third edge, a fourth edge, wherein the proximal end of the second water impermeable sidewall is in contact with the distal end of the inlet sidewall, wherein the first edge of the second water impermeable sidewall is in contact with the second surface of the square base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water impermeable sidewall, wherein the distal end of the filter sidewall is in contact with the distal end of the second water impermeable sidewall, wherein the first edge of the filter is in contact with the second surface of the square base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged; a square cover having a first surface, a second surface, a proximal end, and a distal end, and wherein the second surface of the square cover is in contact with the third edge of the first water impermeable sidewall and the third edge of the second water impermeable sidewall.

The present invention provides a circular storm water pretreatment chamber. The circular storm water pretreatment chamber includes: a circular base having a first surface, a second surface, a proximal end, a distal end, and including: a semi-circular inlet sidewall having a first surface, a second surface, a proximal end, a distal end, a first edge, a second edge, a third edge, a fourth edge, and an semi-circular inlet grate, wherein the first edge of the semi-circular inlet sidewall is in contact with the second surface of the circular base, wherein the first surface of the semi-circular inlet sidewall is in communication with an atmosphere and in position to receive untreated storm water and to collect one or more floating debris that does not pass through the semi-circular inlet grate; a first semi-circular water impermeable sidewall having a first surface, a second surface, a proximal end, a distal end, a first edge, a second edge, a third edge, a fourth edge, wherein the proximal end of the first semi-circular water impermeable sidewall is in contact with the proximal end of the semi-circular inlet sidewall, wherein the first edge of the first semi-circular water impermeable sidewall is in contact with the second surface of the circular base; a second semi-circular water impermeable sidewall having a first surface, a second surface, a proximal end, a distal end, a first edge, a second edge, a third edge, a fourth edge, wherein the proximal end of the second semi-circular water impermeable sidewall is in contact with the distal end of the semi-circular inlet sidewall, wherein the first edge of the second semi-circular water impermeable sidewall is in contact with the second surface of the circular base; a semi-circular filter sidewall having a first surface, a second surface, a proximal end, a distal end, a first edge, a second edge, a third edge, a fourth edge, a semi-circular filter, and an semi-circular outlet grate, wherein the semi-circular filter has a first surface, a second surface, a proximal end, a distal end, a first edge, a second edge, a third edge, and a fourth edge, wherein the semi-circular outlet grate has a first surface, a second surface, a proximal end, a distal end, a first edge, a second edge, a third edge, and a fourth edge, wherein the proximal end of the semi-circular filter sidewall is in contact with the distal end of the first semi-circular water impermeable sidewall, wherein the distal end of the semi-circular filter sidewall is in contact with the distal end of the second semi-circular water impermeable sidewall, wherein the first edge of the semi-circular filter is in contact with the second surface of the circular base, wherein the first edge of the semi-circular outlet grate is in contact with the third edge of the semi-circular filter, the distal end of the first semi-circular water impermeable sidewall, and the distal end of the second semi-circular water impermeable sidewall, wherein the semi-circular inlet sidewall, the first semi-circular water impermeable sidewall, the second semi-circular water impermeable sidewall, and the semi-circular filter sidewall form a debris and sediment trap, wherein the second surface of the semi-circular filter sidewall is in communication with the atmosphere and in position to release treated storm water from the debris and sediment trap into a storm water receiving feature, wherein the semi-circular outlet grate enables storm water to flow out of the debris and sediment trap and into the storm water receiving feature when the semi-circular filter is clogged; a circular cover having a first surface, a second surface, a proximal end, and a distal end, and wherein the second surface of the circular cover is in contact with the third edge of the first semi-circular water impermeable sidewall and the third edge of the second semi-circular water impermeable sidewall.

The present invention provides an oval storm water pretreatment chamber. The oval storm water pretreatment chamber includes: an oval base having a first surface, a second surface, a proximal end, a distal end, and including: a semi-oval inlet sidewall having a first surface, a second surface, a proximal end, a distal end, a first edge, a second edge, a third edge, a fourth edge, and an semi-oval inlet grate, wherein the first edge of the semi-oval inlet sidewall is in contact with the second surface of the oval base, wherein the first surface of the semi-oval inlet sidewall is in communication with an atmosphere and in position to receive untreated storm water and to collect one or more floating debris that does not pass through the semi-oval inlet grate; a first semi-oval water impermeable sidewall having a first surface, a second surface, a proximal end, a distal end, a first edge, a second edge, a third edge, a fourth edge, wherein the proximal end of the first semi-oval water impermeable sidewall is in contact with the proximal end of the semi-oval inlet sidewall, wherein the first edge of the first semi-oval water impermeable sidewall is in contact with the second surface of the oval base; a second semi-oval water impermeable sidewall having a first surface, a second surface, a proximal end, a distal end, a first edge, a second edge, a third edge, a fourth edge, wherein the proximal end of the second semi-oval water impermeable sidewall is in contact with the distal end of the semi-oval inlet sidewall, wherein the first edge of the second semi-oval water impermeable sidewall is in contact with the second surface of the oval base; a semi-oval filter sidewall having a first surface, a second surface, a proximal end, a distal end, a first edge, a second edge, a third edge, a fourth edge, a semi-oval filter, and an semi-oval outlet grate, wherein the semi-oval filter has a first surface, a second surface, a proximal end, a distal end, a first edge, a second edge, a third edge, and a fourth edge, wherein the semi-oval outlet grate has a first surface, a second surface, a proximal end, a distal end, a first edge, a second edge, a third edge, and a fourth edge, wherein the proximal end of the semi-oval filter sidewall is in contact with the distal end of the first semi-oval water impermeable sidewall, wherein the distal end of the semi-oval filter sidewall is in contact with the distal end of the second semi-oval water impermeable sidewall, wherein the first edge of the semi-oval filter is in contact with the second surface of the oval base, wherein the first edge of the semi-oval outlet grate is in contact with the third edge of the semi-oval filter, the distal end of the first semi-oval water impermeable sidewall, and the distal end of the second semi-oval water impermeable sidewall, wherein the semi-oval inlet sidewall, the first semi-oval water impermeable sidewall, the second semi-oval water impermeable sidewall, and the semi-oval filter sidewall form a debris and sediment trap, wherein the second surface of the semi-oval filter sidewall is in communication with the atmosphere and in position to release treated storm water from the debris and sediment trap into a storm water receiving feature, wherein the semi-oval outlet grate enables storm water to flow out of the debris and sediment trap and into the storm water receiving feature when the semi-oval filter is clogged; an oval cover having a first surface, a second surface, a proximal end, and a distal end, and wherein the second surface of the oval cover is in contact with the third edge of the first semi-oval water impermeable sidewall and the third edge of the second semi-oval water impermeable sidewall.

The present invention provides a storm water pretreatment chamber. The storm water pretreatment chamber includes: a water permeable base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the water permeable base, wherein the first surface of the inlet sidewall is in communication with an atmosphere and in position to receive untreated storm water and to collect one or more floating debris that does not pass through the inlet grate; a first water permeable sidewall having a first surface, a second surface, a proximal end, a distal end, a first edge, a second edge, a third edge, a fourth edge, wherein the proximal end of the first water permeable sidewall is in contact with the proximal end of the inlet sidewall, wherein the first edge of the first water permeable sidewall is in contact with the second surface of the water permeable base; a second water permeable sidewall having a first surface, a second surface, a proximal end, a distal end, a first edge, a second edge, a third edge, a fourth edge, wherein the proximal end of the second water permeable sidewall is in contact with the distal end of the inlet sidewall, wherein the first edge of the second water permeable sidewall is in contact with the second surface of the water permeable base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water permeable sidewall, wherein the distal end of the filter sidewall is in contact with the distal end of the second water permeable sidewall, wherein the first edge of the filter is in contact with the second surface of the water permeable base, wherein the first edge of the outlet grate is in contact with the third edge of the filter, the distal end of the first water permeable sidewall, and the distal end of the second water permeable sidewall, wherein the inlet sidewall, the first water permeable sidewall, the second water permeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged; a water permeable cover having a first surface, a second surface, a proximal end, and a distal end, and wherein the second surface of the water permeable cover is in contact with the third edge of the first water permeable sidewall and the third edge of the second water permeable sidewall.

The present invention provides a method of treating storm water. The method includes: passing storm water through a storm water pretreatment chamber, wherein the storm water pretreatment chamber includes: a base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the base, wherein the first surface of the inlet sidewall is in communication with an atmosphere and in position to receive untreated storm water and to collect one or more floating debris that does not pass through the inlet grate; a first water impermeable sidewall having a first surface, a second surface, a proximal end, a distal end, a first edge, a second edge, a third edge, a fourth edge, wherein the proximal end of the first water impermeable sidewall is in contact with the proximal end of the inlet sidewall, wherein the first edge of the first water impermeable sidewall is in contact with the second surface of the base; a second water impermeable sidewall having a first surface, a second surface, a proximal end, a distal end, a first edge, a second edge, a third edge, a fourth edge, wherein the proximal end of the second water impermeable sidewall is in contact with the distal end of the inlet sidewall, wherein the first edge of the second water impermeable sidewall is in contact with the second surface of the base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water impermeable sidewall, wherein the distal end of the filter sidewall is in contact with the distal end of the second water impermeable sidewall, wherein the first edge of the filter is in contact with the second surface of the base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged; a cover having a first surface, a second surface, a proximal end, and a distal end, and wherein the second surface of the cover is in contact with the third edge of the first water impermeable sidewall and the third edge of the second water impermeable sidewall; and separating the floating debris and the sediment.

The present invention provides a method of treating storm water. The method includes: passing storm water through a storm water pretreatment chamber, wherein the storm water pretreatment chamber includes: a water impermeable base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the water impermeable base, wherein the first surface of the inlet sidewall is in communication with an atmosphere and in position to receive untreated storm water and to collect one or more floating debris that does not pass through the inlet grate; a first water impermeable sidewall having a first surface, a second surface, a proximal end, a distal end, a first edge, a second edge, a third edge, a fourth edge, wherein the proximal end of the first water impermeable sidewall is in contact with the proximal end of the inlet sidewall, wherein the first edge of the first water impermeable sidewall is in contact with the second surface of the water impermeable base; a second water impermeable sidewall having a first surface, a second surface, a proximal end, a distal end, a first edge, a second edge, a third edge, a fourth edge, wherein the proximal end of the second water impermeable sidewall is in contact with the distal end of the inlet sidewall, wherein the first edge of the second water impermeable sidewall is in contact with the second surface of the water impermeable base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water impermeable sidewall, wherein the distal end of the filter sidewall is in contact with the distal end of the second water impermeable sidewall, wherein the first edge of the filter is in contact with the second surface of the water impermeable base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged, wherein the outlet grate includes two or more outlet openings that are smaller than two or more inlet openings in the inlet grate, wherein the debris and sediment trap collects materials that are smaller than the two or more inlet openings in the inlet grate and larger than the two or more openings in the filter sidewall; a cover having a first surface, a second surface, a proximal end, a distal end, and a handle on the first surface, wherein the second surface of the cover is in contact with the third edge of the first water impermeable sidewall and the third edge of the second water impermeable sidewall, wherein the cover includes a first roto-lock mechanism at the proximal end that operatively connects to the first water impermeable sidewall and a second roto-lock mechanism at the distal end that operatively connects to the second water impermeable sidewall, a first embedded two-point lifting cable connected to the first surface of the first water impermeable sidewall, and a second embedded two-point lifting cable connected to the second surface of the second water impermeable sidewall; and separating the floating debris and the sediment.

The present invention provides a method of treating storm water. The method includes: passing storm water through a storm water pretreatment chamber, wherein the storm water pretreatment chamber includes: a water impermeable base having a first surface, a second surface, a proximal end, a distal end, and including: an inlet sidewall having a first surface, a second surface, a proximal end, a distal end, a first edge, a second edge, a third edge, a fourth edge, and an inlet grate, wherein the first edge of the inlet sidewall is in contact with the second surface of the water impermeable base, wherein the first surface of the inlet sidewall is in communication with an atmosphere and in position to receive untreated storm water and to collect one or more floating debris that does not pass through the inlet grate; a first water impermeable sidewall having a first surface, a second surface, a proximal end, a distal end, a first edge, a second edge, a third edge, a fourth edge, wherein the proximal end of the first water impermeable sidewall is in contact with the proximal end of the inlet sidewall, wherein the first edge of the first water impermeable sidewall is in contact with the second surface of the water impermeable base; a second water impermeable sidewall having a first surface, a second surface, a proximal end, a distal end, a first edge, a second edge, a third edge, a fourth edge, wherein the proximal end of the second water impermeable sidewall is in contact with the distal end of the inlet sidewall, wherein the first edge of the second water impermeable sidewall is in contact with the second surface of the water impermeable base; a filter sidewall having a first surface, a second surface, a proximal end, a distal end, a first edge, a second edge, a third edge, a fourth edge, a filter, and an outlet grate, wherein the filter has a first surface, a second surface, a proximal end, a distal end, a first edge, a second edge, a third edge, and a fourth edge, wherein the outlet grate has a first surface, a second surface, a proximal end, a distal end, a first edge, a second edge, a third edge, and a fourth edge, wherein the proximal end of the filter sidewall is in contact with the distal end of the first water impermeable sidewall, wherein the distal end of the filter sidewall is in contact with the distal end of the second water impermeable sidewall, wherein the first edge of the filter is in contact with the second surface of the water impermeable base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged, wherein the outlet grate includes two or more outlet openings that are smaller than two or more inlet openings in the inlet grate, wherein the debris and sediment trap collects materials that are smaller than the two or more inlet openings in the inlet grate and larger than the two or more openings in the filter sidewall; a cover having a first surface, a second surface, a proximal end, a distal end, and a handle on the first surface, wherein the second surface of the cover is in contact with the third edge of the first water impermeable sidewall and the third edge of the second water impermeable sidewall, wherein the cover includes a first roto-lock mechanism at the proximal end that operatively connects to the first water impermeable sidewall and a second roto-lock mechanism at the distal end that operatively connects to the second water impermeable sidewall, a first embedded two-point lifting cable connected to the first surface of the first water impermeable sidewall, and a second embedded two-point lifting cable connected to the second surface of the second water impermeable sidewall; and separating the floating debris and the sediment.

BRIEF DESCRIPTION OF THE DRAWINGS

Embodiments of the invention may be best understood by referring to the following description and accompanying drawings, which illustrate such embodiments. In the drawings.

Figure 1:
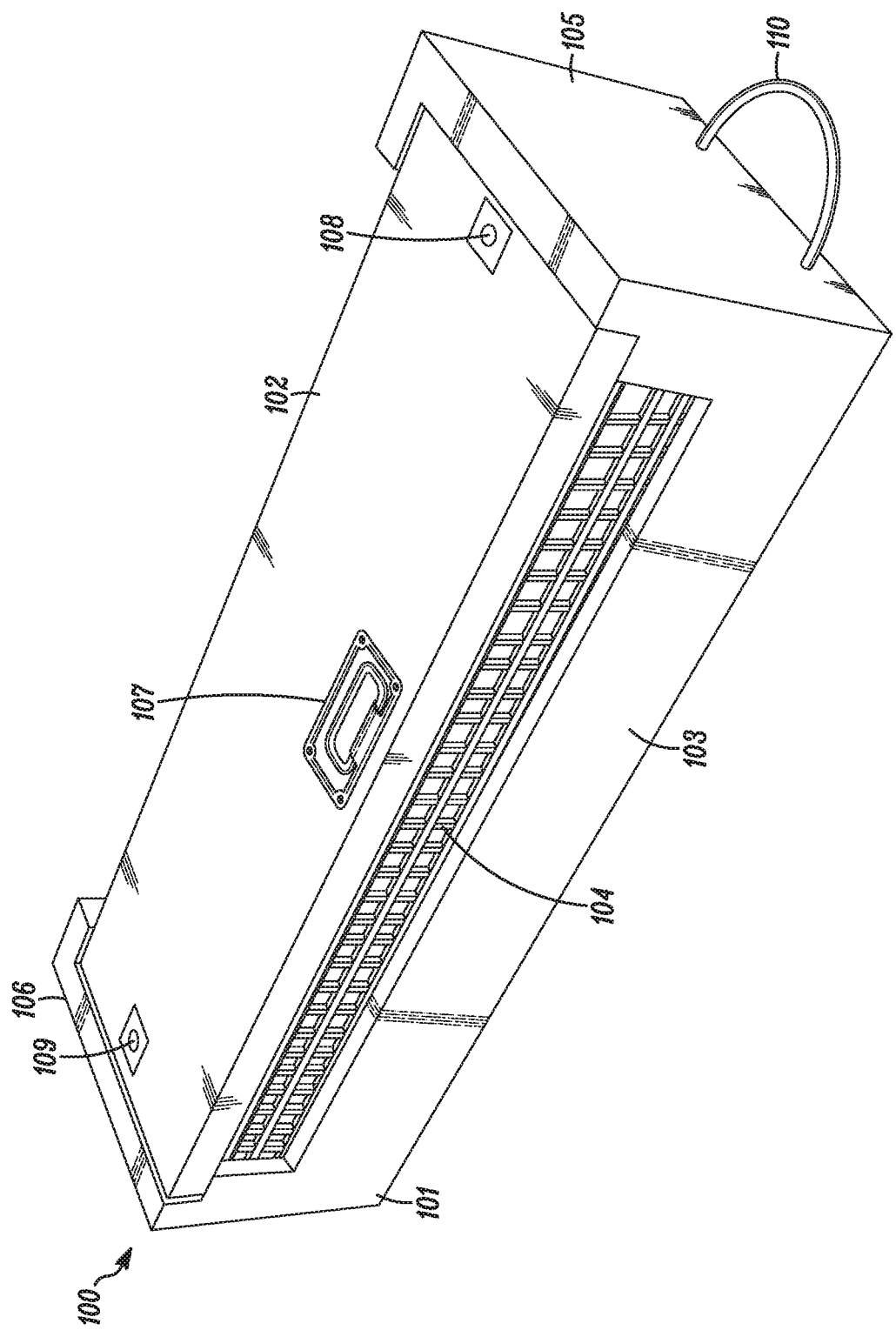
FIG. 1 is a perspective front view drawing illustrating an exemplary storm water pretreatment chamber.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides a storm water pretreatment chamber. The storm water pretreatment chamber includes: a base, an inlet sidewall, a first sidewall, a second sidewall, and a filter sidewall. Methods of treating storm water are also provided.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "about" refers to a variation of 10 percent of the value specified; for example about 50 percent carries a variation from 45 to 55 percent.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the term "comprising" or "comprises" is intended to mean that the compositions and methods include the recited elements, but not excluding others.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the phrase "area drain" refers to a drain that collects surface water into one or more small inlet boxes and into a storm water receiving feature.

As used herein, the phrase "French drain" refers to a ditch filled with gravel or rock that redirects surface and ground water away from an area and into a storm water receiving feature.

As used herein, the phrase "curb inlet" refers to a location where storm water runoff from the street into the storm water receiving feature.

As used herein, the phrase "drop inlet" refers to a location where storm water runoff from an open area can enter a drain leading into a storm water receiving feature.

As used herein, the phrase "curb-cut" refers to a curb with the curb wall either removed or lowered so that storm water may exit it.

As used herein, the term "flume" refers to an open artificial channel or chute carrying a stream of water into a storm water receiving feature.

As used herein, the term "swale" refers to a depression between slopes that carries drainage into a storm water receiving feature.

As used herein, the phrase "operatively coupled" refers to bringing two or more items together or into relationship with each other such that they may operate together or allow transfer of information between the two or more items.

As used herein, the terms "include," "for example," "such as," and the like are used illustratively and are not intended to limit the present invention.

As used herein, the terms "invention," "the invention," "this invention," "the present invention" and "disclosure" are intended to refer broadly to all of the subject matter of this patent and the patent claims below. Statements containing these terms should be understood not to limit the subject matter described herein or to limit the meaning or scope of the patent claims below. The subject matter should be understood by reference to appropriate portions of the entire specification of this patent, any or all drawings and each claim.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "proximal" refers to the closest end of an object. In contrast, the term "distal" refers to the farthest end of an object.

As used herein, the phrase "storm water conveyance" refers to any device, natural or man-made, that conducts storm water into the storm water pretreatment chamber. Typically, a storm water conveyance is a curb-cut, a curb inlet, a drop inlet, a ramp, a pipe, a flume, a swale, a French drain, an area drain, a private drain, and the like that allows storm water to run from a street, down spout, sidewalk, parking lot, and the like, or combinations thereof, into the storm water pretreatment chamber.

As used herein, the phrase "storm water receiving feature" refers to a feature that is designated to receive storm water. Typically, storm water receiving features include, for example, rain gardens, tree boxes, infiltration trenches, wet and dry ponds, infiltration benches, vegetated swales, and the like, or combinations thereof.

As used herein, the phrase "storm water" refers to untreated water runoff from land and impervious areas, for example, paved streets, parking lots, building rooftops, and the like during rainfall and snow events. As used herein, the phrase "storm water" may also refer untreated water runoff from urban or industrial source, for example irrigation, wash water, air conditioning condensate, and the like.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element which they describe, as the various elements may be oriented differently in various applications.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention illustratively disclosed herein suitably may be practiced in the absence of any element which is not specifically disclosed herein.

FIG. 1 is a perspective front view drawing illustrating an exemplary storm water pretreatment chamber 100. The storm water pretreatment chamber 100 included a base 101, a cover 102, an inlet sidewall 103, an inlet grate 104, a first sidewall 105, a second sidewall 106, a filter sidewall (not shown), a handle 107, a first locking mechanism 108, a second locking mechanism 109, a first lifting cable 110, and a second lifting cable (not shown).

Figure 2:
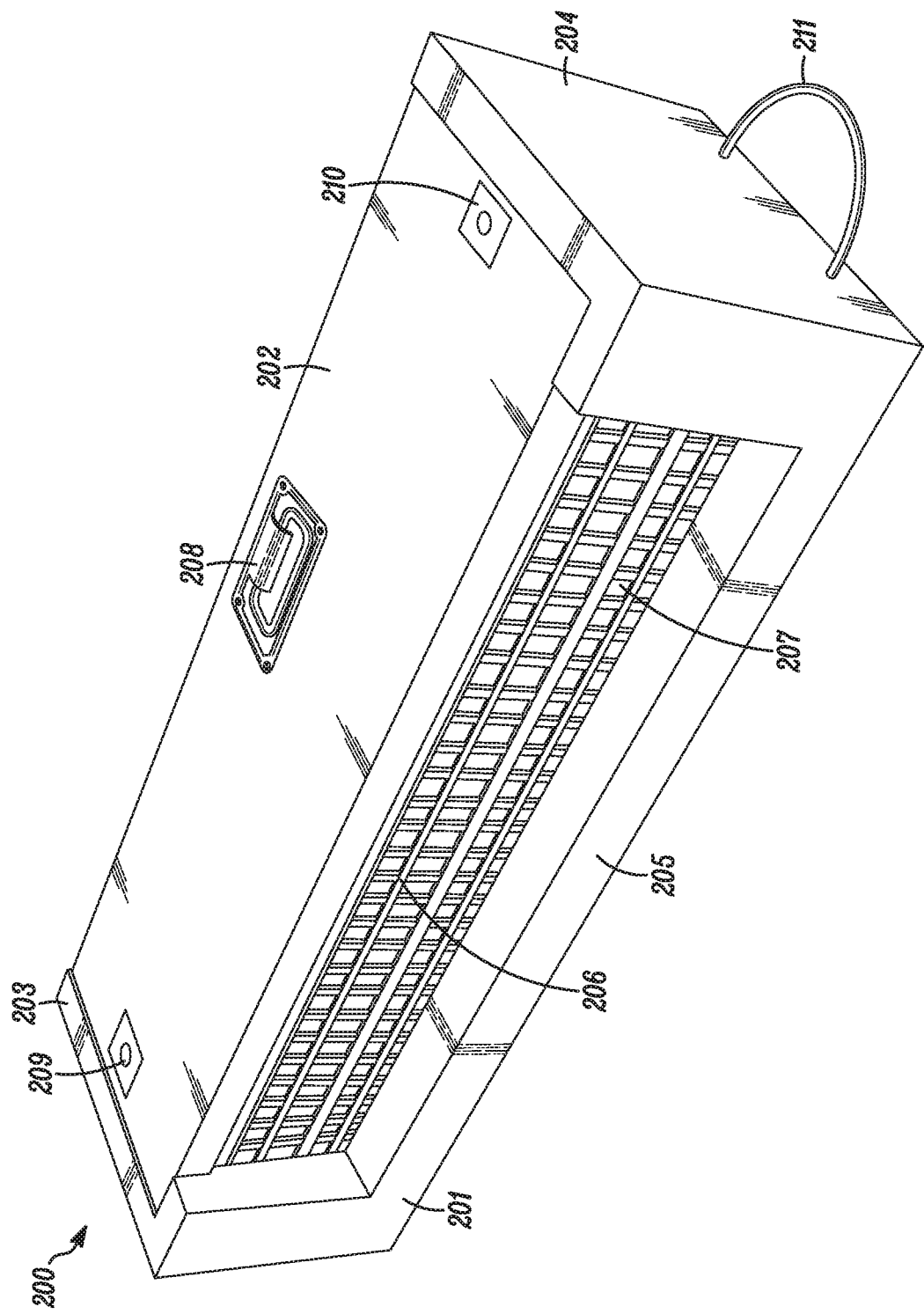
FIG. 2 is a perspective rear view drawing illustrating an exemplary storm water pretreatment chamber.

FIG. 2 is a perspective rear view drawing illustrating an exemplary storm water pretreatment chamber 200. The storm water pretreatment chamber 200 included a base 201, a cover 202, an inlet sidewall (not shown), a first sidewall 203, a second sidewall 204, a filter sidewall 205, an outlet grate 206, a filter 207, a handle 208, a first locking mechanism 209, a second locking mechanism 210, a first lifting cable (not shown), and a second lifting cable 211.

Figure 3:
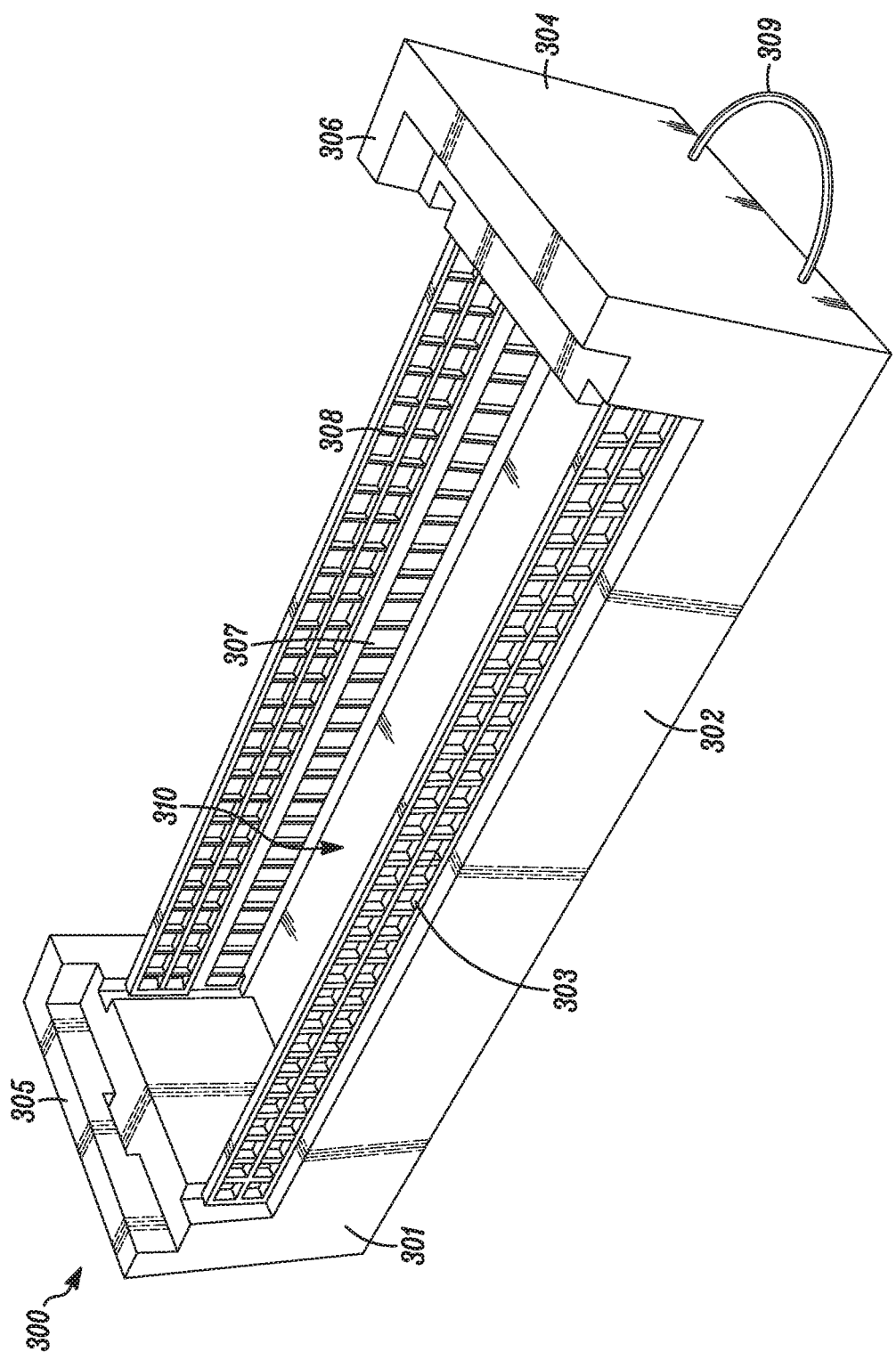
FIG. 3 is a perspective front view drawing illustrating an exemplary storm water pretreatment chamber without a cover.

FIG. 3 is a perspective front view drawing illustrating an exemplary storm water pretreatment chamber 300 without a cover. The storm water pretreatment chamber 300 included a base 301, a cover (not shown), an inlet sidewall 302, an inlet grate 303, a first sidewall 304, a second sidewall 305, a filter sidewall 306, a filter 307, an outlet grate 308, a first lifting cable 309, and a second lifting cable (not shown). The base 301 has a first surface, a second surface, a proximal end, and a distal end. The base 301 includes an inlet sidewall 302, a first sidewall 304, a second sidewall 305, and a filter sidewall 306. The inlet sidewall 302 has a first surface, a second surface, a proximal end, a distal end, a first edge, a second edge, a third edge, a fourth edge, and an inlet grate 303. The first edge of the inlet sidewall 302 is in contact with the second surface of the base 301. The first surface of the inlet sidewall 302 is in communication with an atmosphere and in position to receive untreated storm water and to collect one or more floating debris that does not pass through the inlet grate 303. The first sidewall 304 has a first surface, a second surface, a proximal end, a distal end, a first edge, a second edge, a third edge, and a fourth edge. The proximal end of the first sidewall 304 is in contact with the proximal end of the inlet sidewall 302. The first edge of the first sidewall 304 is in contact with the second surface of the base 301. The second sidewall 305 has a first surface, a second surface, a proximal end, a distal end, a first edge, a second edge, a third edge, and a fourth edge. The proximal end of the second sidewall 305 is in contact with the distal end of the inlet sidewall 302. The first edge of the second sidewall 305 is in contact with the second surface of the base 301. The filter sidewall 306 has a first surface, a second surface, a proximal end, a distal end, a first edge, a second edge, a third edge, a fourth edge, a filter 307, and an outlet grate 308. The filter 307 has a first surface, a second surface, a proximal end, a distal end, a first edge, a second edge, a third edge, and a fourth edge. The outlet grate 308 has a first surface, a second surface, a proximal end, a distal end, a first edge, a second edge, a third edge, and a fourth edge. The proximal end of the filter sidewall 306 is in contact with the distal end of the first sidewall 304. The distal end of the filter sidewall 306 is in contact with the distal end of the second sidewall 305. The first edge of the filter 307 is in contact with the second surface of the base 301. The first edge of the outlet grate 308 is in contact with the third edge of the filter 307, the distal end of the first sidewall 304 and the distal end of the second sidewall 305. The base 301, the inlet sidewall 302, the first sidewall 304, the second sidewall 305, and the filter sidewall 306 form a debris and sediment trap 310. The second surface of the filter sidewall 306 is in communication with the atmosphere and in position to release treated storm water from the debris and sediment trap 310 into a storm water receiving feature (not shown). The outlet grate 309 enables storm water to flow out of the debris and sediment trap 310 and into the storm water receiving feature (not shown) when the filter 308 is unable to filter the storm water. The cover (not shown) has a first surface, a second surface, a proximal end, and a distal end. When the cover (not shown) is in place, the second surface of the cover (not shown) is in contact with the third edge of the inlet sidewall 302, the third edge of the first sidewall 304, the third edge of the second sidewall 305, and the third edge of the filter sidewall 306.

Figure 4:
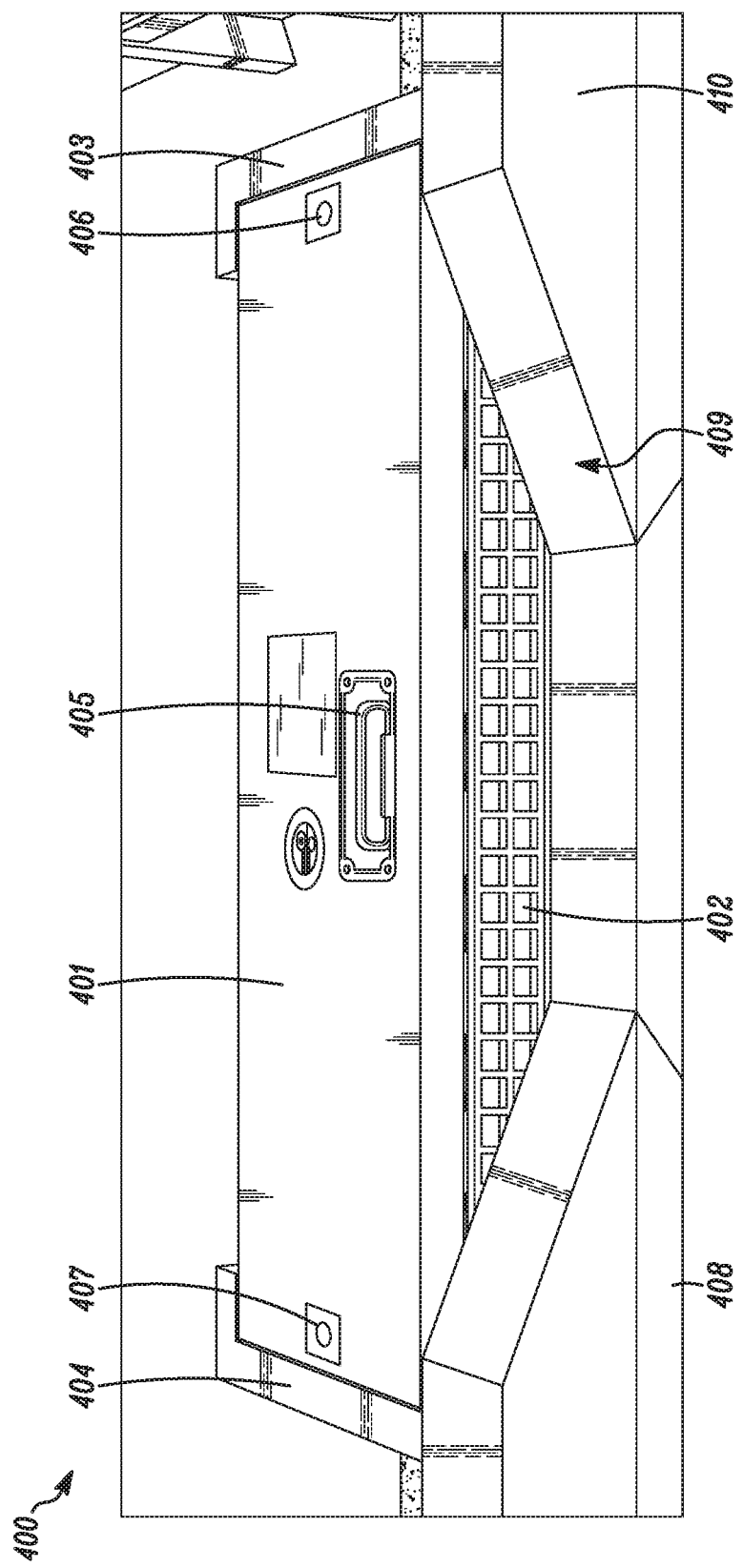
FIG. 4 is a perspective front view drawing illustrating an exemplary storm water pretreatment chamber on a street curb.

FIG. 4 is a perspective front view drawing illustrating an exemplary storm water pretreatment chamber 400 on a street curb. The storm water pretreatment chamber 400 included a base (not shown), a cover 401, an inlet sidewall (not shown), an inlet grate 402, a first sidewall 403, a second sidewall 404, a filter sidewall (not shown), a handle 405, a first locking mechanism 406, and a second locking mechanism 407. The inlet grate 403 accepts storm water from the street 408 via a channel 409 in the curb 410.

Figure 5:
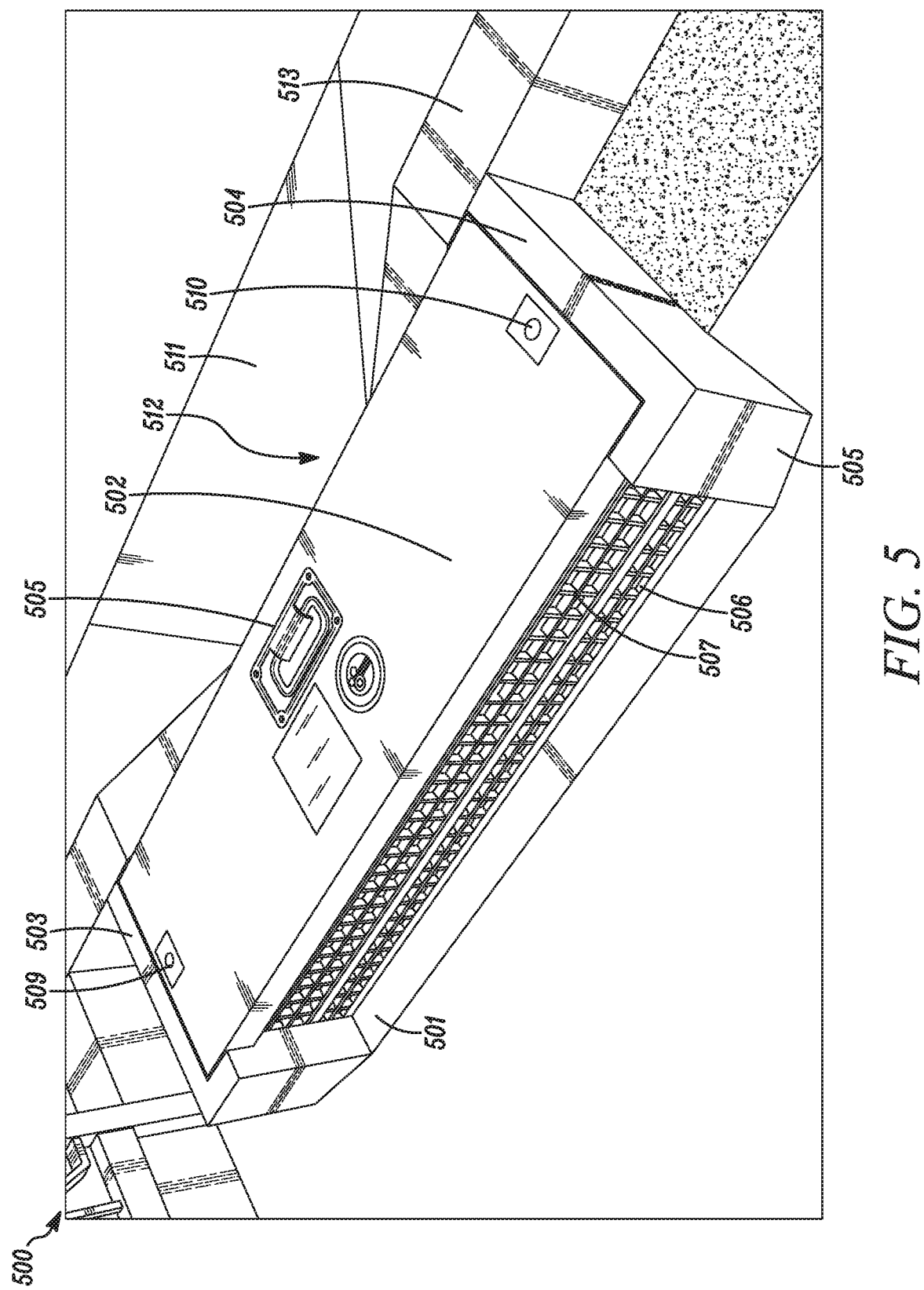
FIG. 5 is a perspective rear view drawing illustrating an exemplary storm water pretreatment chamber on a street curb.

FIG. 5 is a perspective rear view drawing illustrating an exemplary storm water pretreatment chamber 500 on a street curb. The storm water pretreatment chamber 500 included a base 501, a cover 502, an inlet sidewall (not shown), an inlet grate (not shown), a first sidewall 503, a second sidewall 504, a filter sidewall 505, a filter 506, an outlet grate 507, a handle 508, a first locking mechanism 509, and a second locking mechanism 510. The inlet grate (not shown) accepts storm water from the street 511 via a channel 512 in the curb 513. The filter 506 and the outlet grate 507 discharged treated storm water into the surrounding rain garden 514.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y. and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance or component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicants reserve the right to physically incorporate into this specification any and all materials and information from any such patents, applications, publications, scientific articles, web sites, electronically available information, and other referenced materials or documents. Applicants reserve the right to physically incorporate into any part of this document, including any part of the written description, the claims referred to above including but not limited to any original claims.

What is claimed is:

1. A storm water pretreatment chamber comprising:
a water impermeable base having a first surface, a second surface, a proximal end, a distal end, and comprising:
an inlet sidewall having a first surface, a second surface, a proximal end, a distal end, a first edge, a second edge, a third edge, and a fourth edge,
wherein the first edge of the inlet sidewall is in contact with the second surface of the water impermeable base,
wherein the first surface of the inlet sidewall is in communication with an atmosphere and in position to receive untreated storm water;
a first water impermeable sidewall having a first surface, a second surface, a proximal end, a distal end, a first edge, a second edge, a third edge, a fourth edge,
wherein the proximal end of the first water impermeable sidewall is in contact with the proximal end of the inlet sidewall,
wherein the first edge of the first water impermeable sidewall is in contact with the second surface of the water impermeable base;
a second water impermeable sidewall having a first surface, a second surface, a proximal end, a distal end, a first edge, a second edge, a third edge; a fourth edge,
wherein the proximal end of the second water impermeable sidewall is in contact with the distal end of the inlet sidewall,
wherein the first edge of the second water impermeable sidewall is in contact with the second surface of the water impermeable base;
a filter sidewall having a first surface, a second surface, a proximal end, a distal end, a first edge, a second edge, a third edge, a fourth edge, a filter, and an outlet grate,
wherein the filter has a first surface, a second surface, a proximal end, a distal end, a first edge, a second edge, a third edge, and a fourth edge,
wherein the outlet grate has a first surface, a second surface, a proximal end, a distal end, a first edge, a second edge, a third edge, and a fourth edge,
wherein the proximal end of the filter sidewall is in contact with the distal end of the first water impermeable sidewall,
wherein the distal end of the filter sidewall is in contact with the distal end of the second water impermeable sidewall,
wherein the first edge of the filter is in contact with the second surface of the water impermeable base,
wherein the first edge of the outlet grate is in contact with the third edge of the filter, the distal end of the first water impermeable sidewall, and the distal end of the second water impermeable sidewall,
wherein the inlet sidewall, the first water impermeable sidewall, the second water impermeable sidewall, and the filter sidewall form a debris and sediment trap,
wherein the second surface of the filter sidewall is in communication with the atmosphere and in position to release treated storm water from the debris and sediment trap into a storm water receiving feature, and
wherein the outlet grate enables storm water to flow out of the debris and sediment trap and into the storm water receiving feature when the filter is clogged.

2. The storm water pretreatment chamber of claim 1, further comprising a cover having a first surface, a second surface, a proximal end, and a distal end, and wherein the second surface of the cover is in contact with the third edge of the first water impermeable sidewall and the third edge of the second water impermeable sidewall.

3. The storm water pretreatment chamber of claim 2, wherein the cover comprises a handle connected to the first surface of the cover.

4. The storm water pretreatment chamber of claim 2, wherein the cover comprises a first locking mechanism at the proximal end that operatively connects to the first water impermeable sidewall and a second locking mechanism at the distal end that operatively connects to the second water impermeable sidewall.

5. The storm water pretreatment chamber of claim 1, further comprising a first lifting cable connected to the first surface of the first water impermeable sidewall.

6. The storm water pretreatment chamber of claim 1, further comprising a second lifting cable connected to the second surface of the second water impermeable sidewall.

7. The storm water pretreatment chamber of claim 1, wherein the inlet sidewall further comprises an inlet grate.

8. The storm water pretreatment chamber of claim 7, wherein the outlet grate comprises two or more outlet openings that are smaller than two or more inlet openings in the inlet grate.

9. A storm water pretreatment chamber comprising:
a water impermeable base having a first surface, a second surface, a proximal end, a distal end, and comprising:
an inlet sidewall having a first surface, a second surface, a proximal end, a distal end, a first edge, a second edge, a third edge, a fourth edge, and an inlet grate,
wherein the first edge of the inlet sidewall is in contact with the second surface of the water impermeable base,
wherein the first surface of the inlet sidewall is in communication with an atmosphere and in position to receive untreated storm water and to collect one or more floating debris that does not pass through the inlet grate;
a first water impermeable sidewall having a first surface, a second surface, a proximal end, a distal end, a first edge, a second edge, a third edge, a fourth edge,
wherein the proximal end of the first water impermeable sidewall is in contact with the proximal end of the inlet sidewall,
wherein the first edge of the first water impermeable sidewall is in contact with the second surface of the water impermeable base;

a second water impermeable sidewall having a first
surface, a second surface, a proximal end, a distal
end, a first edge, a second edge, a third edge, a fourth
edge,
wherein the proximal end of the second water impermeable sidewall is in contact with the distal end of
the inlet sidewall,
wherein the first edge of the second water impermeable sidewall is in contact with the second surface
of the water impermeable base;
a filter sidewall having a first surface, a second surface,
a proximal end, a distal end, a first edge, a second
edge, a third edge, a fourth edge, a filter, and an
outlet grate,
wherein the filter has a first surface, a second surface,
a proximal end, a distal end, a first edge, a second
edge, a third edge, and a fourth edge,
wherein the outlet grate has a first surface, a second
surface, a proximal end, a distal end, a first edge,
a second edge, a third edge, and a fourth edge,
wherein the proximal end of the filter sidewall is in
contact with the distal end of the first water
impermeable sidewall,
wherein the distal end of the filter sidewall is in
contact with the distal end of the second water
impermeable sidewall,
wherein the first edge of the filter is in contact with
the second surface of the water impermeable base,
wherein the first edge of the outlet grate is in contact
with the third edge of the filter, the distal end of
the first water impermeable sidewall, and the
distal end of the second water impermeable sidewall,
wherein the inlet sidewall, the first water impermeable sidewall, the second water impermeable sidewall, and the filter sidewall form a debris and
sediment trap,
wherein the second surface of the filter sidewall is in
communication with the atmosphere and in position to release treated storm water from the debris
and sediment trap into a storm water receiving
feature,
wherein the outlet grate enables storm water to flow
out of the debris and sediment trap and into the
storm water receiving feature when the filter is
dogged;
a cover having a first surface, a second surface; a proximal
end, a distal end, and a handle on the first surface,
wherein the second surface of the cover is in contact
with the third edge of the first water impermeable
sidewall and the third edge of the second water
impermeable sidewall,
wherein the cover comprises a first locking mechanism
at the proximal end that operatively connects to the
first water impermeable sidewall and a second locking mechanism at the distal end that operatively
connects to the second water impermeable sidewall,
a first lifting cable connected to the first surface of the first
water impermeable sidewall; and
a second lifting cable connected to the second surface of
the second water impermeable sidewall.

10. The storm water pretreatment chamber of claim 9,
wherein the first locking mechanism is a first roto-lock
mechanism.

11. The storm water pretreatment chamber of claim 9,
wherein the second locking mechanism is a second roto-lock
mechanism.

12. The storm water pretreatment chamber of claim 9,
wherein the first lifting cable is a first embedded two-point
lifting cable.

13. The storm water pretreatment chamber of claim 9,
wherein the second lifting cable is a second embedded
two-point lifting cable.

14. The storm water pretreatment chamber of claim 9,
wherein the outlet grate comprises two or more outlet
openings that are smaller than two or more inlet openings in
the inlet grate.

15. The storm water pretreatment chamber of claim 9,
wherein the debris and sediment trap collects materials that
are smaller than two or more inlet openings in the inlet grate
and larger than two or more openings in the filter sidewall.

16. A storm water pretreatment chamber comprising:
a water impermeable base having a first surface, a second
surface, a proximal end, a distal end, and comprising:
an inlet sidewall having a first surface, a second surface, a proximal end, a distal end, a first edge, a
second edge, a third edge, a fourth edge, and an inlet
grate,
wherein the first edge of the inlet sidewall is in
contact with the second surface of the water
impermeable base,
wherein the first surface of the inlet sidewall is in
communication with an atmosphere and in position to receive untreated storm water and to collect
one or more floating debris that does not pass
through the inlet grate;
a first water impermeable sidewall having a first surface, a second surface, a proximal end, a distal end,
a first edge, a second edge, a third edge, a fourth
edge,
wherein the proximal end of the first water impermeable sidewall is in contact with the proximal
end of the inlet sidewall,
wherein the first edge of the first water impermeable
sidewall is in contact with the second surface of
the water impermeable base;
a second water impermeable sidewall having a first
surface, a second surface, a proximal end, a distal
end, a first edge, a second edge, a third edge, a fourth
edge,
wherein the proximal end of the second water impermeable sidewall is in contact with the distal end of
the inlet sidewall,
wherein the first edge of the second water impermeable sidewall is in contact with the second surface
of the water impermeable base;
a filter sidewall having a first surface, a second surface,
a proximal end, a distal end, a first edge, a second
edge, a third edge, a fourth edge, a filter, and an
outlet grate,
wherein the filter has a first surface, a second surface,
a proximal end, a distal end, a first edge, a second
edge, a third edge, and a fourth edge,
wherein the outlet grate has a first surface, a second
surface, a proximal end, a distal end, a first edge,
a second edge, a third edge, and a fourth edge,
wherein the proximal end of the filter sidewall is in
contact with the distal end of the first water
impermeable sidewall,
wherein the distal end of the filter sidewall is in
contact with the distal end of the second water
impermeable sidewall,
wherein the first edge of the filter is in contact with
the second surface of the water impermeable base, wherein the first edge of the outlet grate is in contact with the third edge of the filter, the distal end of the first water impermeable sidewall, and the distal end of the second water impermeable sidewall, wherein the inlet sidewall, the first water impermeable sidewall, the second water impermeable sidewall, and the filter sidewall form a debris and sediment trap, wherein the second surface of the filter sidewall is in communication with the atmosphere and in position to release treated storm water from the debris and sediment trap into a storm water receiving feature, wherein the outlet grate enables storm water to flow out of the debris and sediment trap and into the storm water receiving feature when the filter is clogged, wherein the outlet grate comprises two or more outlet openings that are smaller than two or more inlet openings in the inlet grate, wherein the debris and sediment trap collects materials that are smaller than the two or more inlet openings in the inlet grate and larger than the two or more openings in the filter sidewall;

a cover having a first surface, a second surface, a proximal end, a distal end, and a handle on the first surface, wherein the second surface of the cover is in contact with the third edge of the first water impermeable sidewall and the third edge of the second water impermeable sidewall, wherein the cover comprises a first roto-lock mechanism at the proximal end that operatively connects to the first water impermeable sidewall and a second roto-lock mechanism at the distal end that operatively connects to the second water impermeable sidewall, a first embedded two-point lifting cable connected to the first surface of the first water impermeable sidewall, and a second embedded two-point lifting cable connected to the second surface of the second water impermeable sidewall.

17. The storm water pretreatment chamber of claim 16, wherein the water impermeable base, the inlet sidewall, the first water impermeable sidewall, and the second water impermeable sidewall each independently comprise a steel-reinforced concrete.

18. The storm water pretreatment chamber of claim 16, wherein the cover is a fiberglass reinforced plastic composite material.

19. The storm water pretreatment chamber of claim 16, wherein the filter comprises a fiberglass grate with a plastic-coated woven screen in an anodized aluminum frame, a fiberglass grate with a rubber-coated woven screen in an anodized aluminum frame, or a fiberglass grate with a plastic and rubber-coated woven screen in an anodized aluminum frame.

20. The storm water pretreatment chamber of claim 16, wherein the inlet grate and the outlet grate each independently comprise a fiberglass.

* * * * *